(12) United States Patent
Parodi et al.

(10) Patent No.: US 10,549,767 B2
(45) Date of Patent: Feb. 4, 2020

(54) WHEEL DRIVE CART FOR AN ITEM TRANSPORTING AND SORTING SYSTEM

(71) Applicant: LEONARDO S.p.A., Rome (IT)

(72) Inventors: Carlo Luigi Parodi, Rome (IT);
Riccardo Cerutti, Rome (IT);
Alessandro Del Vacchio, Rome (IT)

(73) Assignee: LEONARDO S.P.A., Rome (IT)

( * ) Notice: Subject to any disclaimer, the term of this patent is extended or adjusted under 35 U.S.C. 154(b) by 206 days.

(21) Appl. No.: 15/512,205

(22) PCT Filed: Sep. 18, 2015

(86) PCT No.: PCT/IB2015/057211
§ 371 (c)(1),
(2) Date: Mar. 17, 2017

(87) PCT Pub. No.: WO2016/042534
PCT Pub. Date: Mar. 24, 2016

(65) Prior Publication Data
US 2017/0291617 A1 Oct. 12, 2017

(30) Foreign Application Priority Data

Sep. 19, 2014 (IT) .............................. TO2014A0745

(51) Int. Cl.
*B61F 5/38* (2006.01)
*B61C 3/00* (2006.01)
*B61F 3/12* (2006.01)
*B65G 35/06* (2006.01)

(52) U.S. Cl.
CPC ................. *B61F 5/38* (2013.01); *B61C 3/00* (2013.01); *B61F 3/12* (2013.01); *B65G 35/06* (2013.01)

(58) Field of Classification Search
CPC .. B61B 3/00; B61B 3/02; B61B 13/00; E01B 25/00; E01B 25/08; E01B 25/22; E01B 25/24
See application file for complete search history.

(56) References Cited

U.S. PATENT DOCUMENTS

| | | | |
|---|---|---|---|
| 6,182,576 B1* | 2/2001 | Svensson | B60L 5/38 104/118 |
| 2005/0167241 A1* | 8/2005 | Hishinuma | B65G 17/345 198/370.06 |
| 2010/0059333 A1 | 3/2010 | Van Den Goor et al. | |
| 2012/0012438 A1 | 1/2012 | Heitplatz | |

(Continued)

FOREIGN PATENT DOCUMENTS

| | | |
|---|---|---|
| EP | 2218661 A1 | 8/2010 |
| WO | 2008/094033 A1 | 8/2008 |

*Primary Examiner* — Robert J McCarry, Jr.
(74) *Attorney, Agent, or Firm* — Greenblum & Bernstein, P.L.C.

(57) ABSTRACT

A wheel drive cart for a transporting and/or sorting system configured to tow a plurality of loading carts movable along a closed path, constituted by a first and a second rail parallel to each other, between a loading and unloading stations. The cart includes a pair of direct drive wheels without reducers, with each wheel including an electric motor having a stator, integral with a bracket hinged to a frame of the cart, and a rotor, a peripheral outward facing portion of which forms a cylindrical surface of the wheel designed to roll on a resting surface of a respective rail.

13 Claims, 7 Drawing Sheets

(56) References Cited

U.S. PATENT DOCUMENTS

2014/0014468 A1* 1/2014 Pilarz .................... B65G 47/53
                                                    198/370.03
2017/0029215 A1    2/2017 Parodi et al.

* cited by examiner

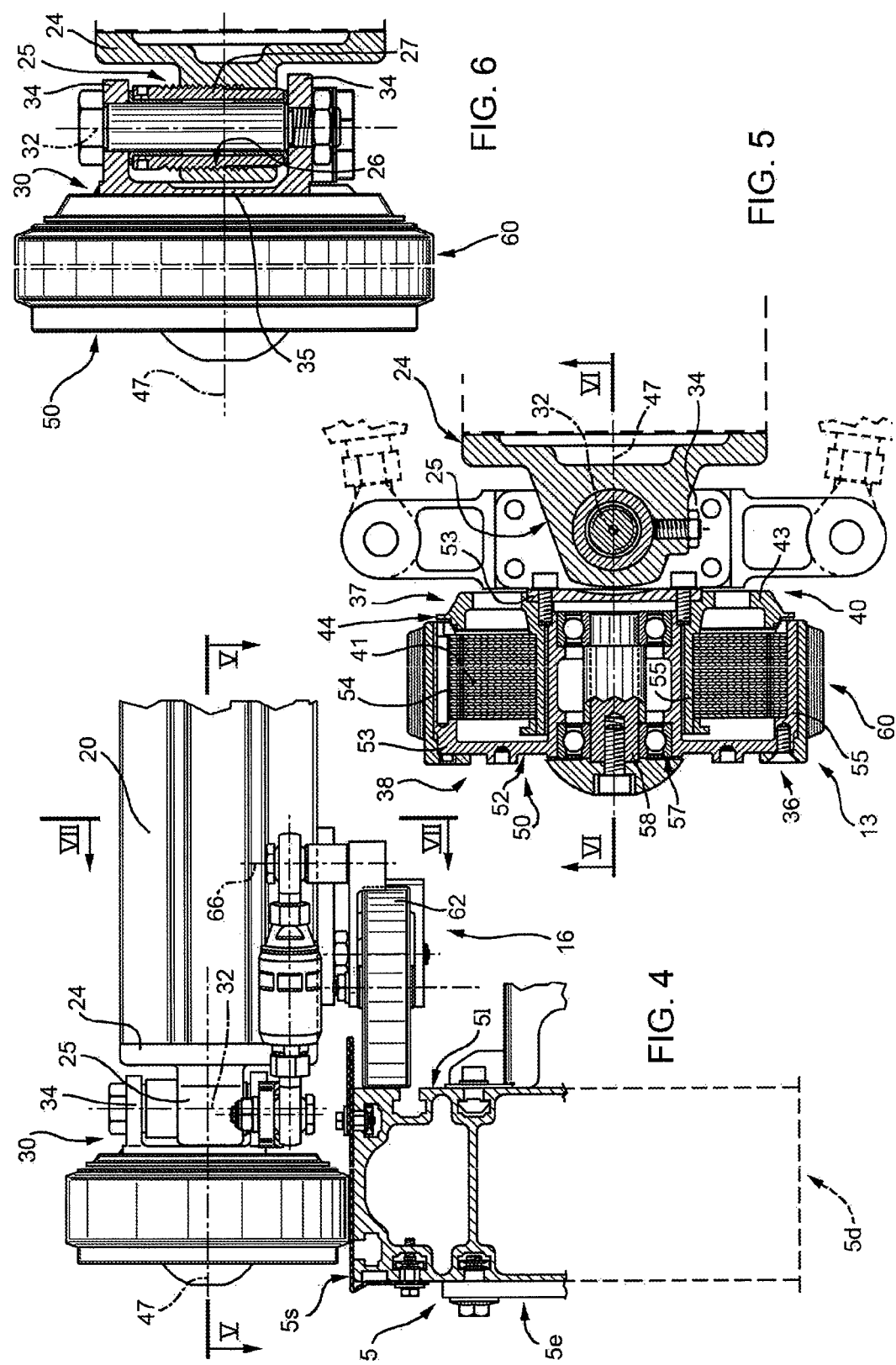

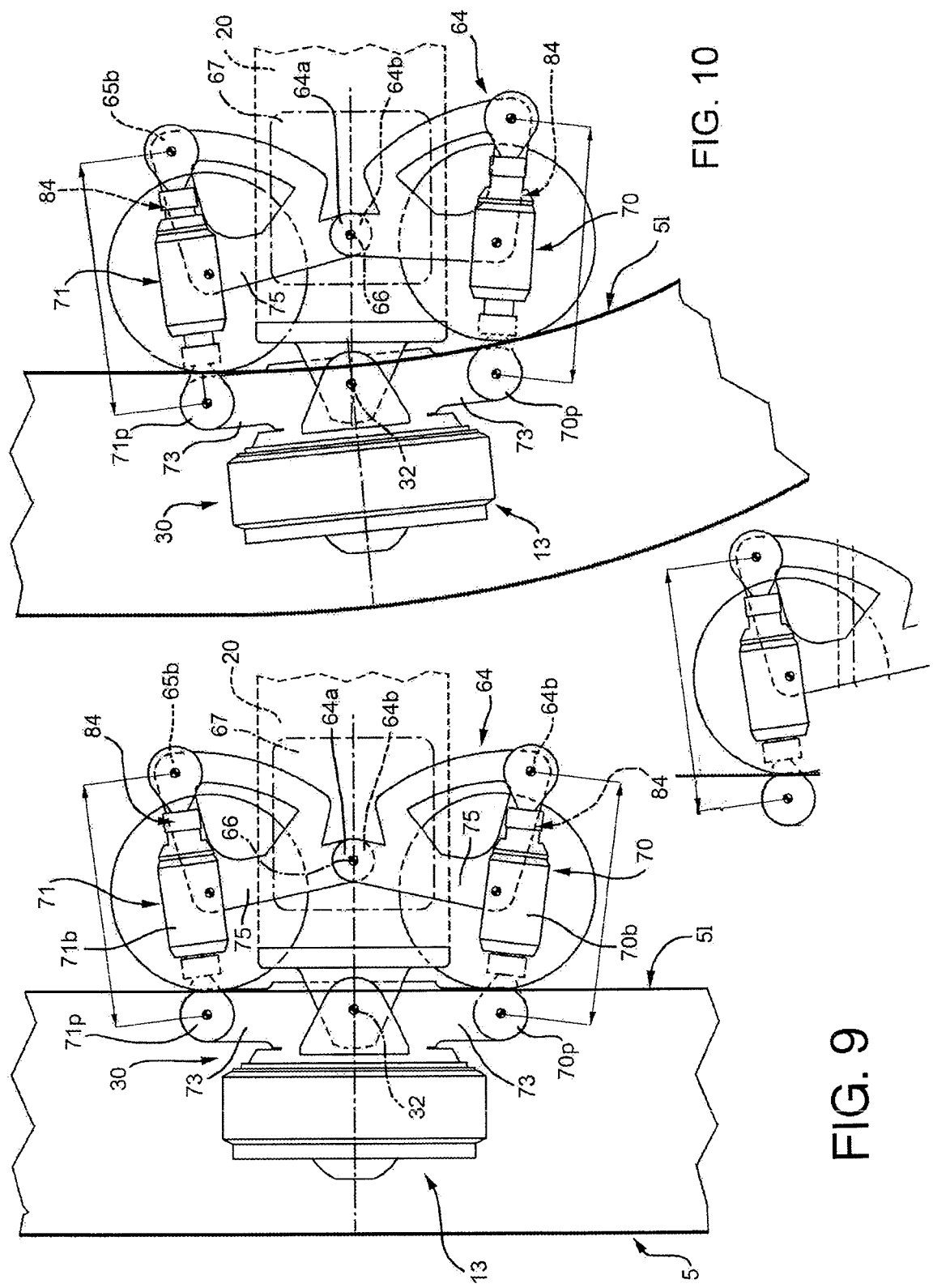

WHEEL DRIVE CART FOR AN ITEM TRANSPORTING AND SORTING SYSTEM

TECHNICAL FIELD

The present invention relates to a wheel drive cart for an item transporting and sorting system.

BACKGROUND ART

There are known item sorting systems where a wheel drive cart is configured to tow a plurality of loading carts along a closed path defined by a pair of rails where at least one item feeding station arranged along the rails is configured to load items onto the carts and at least one unloading station arranged along the rails is configured to receive items unloaded from the carts.

For example, each cart can support a powered belt or a tray that can be inclined with respect to a rotation axis. In the first case, the item placed on the powered belt is actively discharged sideways at the unloading station, while in the case of using a tray this can be opportunely tilted in the unloading step so that the item resting on the tray falls by gravity.

Non-limitative examples of transportable/sortable items are:
- luggage handled by an airport-type luggage sorting system;
- mail items (bundles of mail items, parcels, boxes, packets in general, etc.) handled by a mail sorting system;
- packaged products (boxes for example) picked from a warehouse and sent to a delivery system.

The wheel drive cart typically comprises a supporting frame provided with a first and a second idler wheel arranged on opposite sides of the frame and adapted to rest on respective first and second resting surfaces of the first and second rail, which face upwards in use. The wheel drive cart further comprises at least one first contrast idler wheel carried by the frame and adapted to abut on a first inner side of the first rail facing a second inner side of the second rail on which a second contrast wheel abuts in order to keep the wheel drive cart positioned between the first and the second rail during movement of the wheel drive cart along the rails.

Different technologies are used to provide the motion of the wheel drive cart. For example, wheel drive carts could be provided with high-energy permanent magnets (typically rare earths) having the function of a rotor and stator coils arranged along the rail that are powered in sequence to obtain a moving magnetic field, which by interacting with the permanent magnets causes movement of the cart along the track.

Using opportune mechanical solutions, a constant air gap of a few millimetres is guaranteed between the carts and the stator coils, so that the magnetic field generated by the permanent magnets can be detected and used to control the powering of the coils.

The main advantage of this solution is represented by the total absence of contact between the parts that form the linear electric motor which drives the cart; for this reason, maintenance is extremely low, as there is virtually no wear on the parts in movement.

The limits of the above-described magnetic solution are instead represented by the high costs associated with the permanent magnets and the coil system, and by the high mechanical rigidity required to maintain the predetermined air gap under all conditions of motion conditions along the track.

Other solutions of the mechanical type envisage the use of groups of pinch wheels driven by motor reducers and arranged along the path beneath the rails. These pinch wheels are configured to pinch opportunely shaped fins rigidly constrained under the carts and thus impart acceleration to the carts.

In particular, each group of pinch wheels forms a driving force zone that contributes to generating part of the overall propelling force with a tractive load that is thus spread over several carts along the rails.

The main drawbacks of this mechanical type of solution are represented by the need for careful and constant maintenance of the pinch groups, and by the risk of carts crashing against the pinch group and the track in the event of jamming anomalies. Furthermore, the distribution and electrical wiring of the pinch groups along the track are often problematic.

In addition, solutions of the electromechanical type have been proposed in which the wheels of the cart have been motorized by using electric motors carried on the cart. These solutions envisage that the electric motor cooperates with a complex mechanical drive train for transfer of motive power from the motor to the drive wheels and the reduction of the number of revs of the electric motor. Use of a mechanical drive train entails a series of problems as it is heavy, bulky and has intrinsic reliability problems as, in the case of failure within the drive train, it is practically impossible to mechanically disconnect the transmission from the electric motor while the cart is in movement.

None of the proposed solutions therefore satisfies the requirements requested for sorting systems.

These requirements are particularly pressing as the market asks for sorting and transporting systems capable of operating almost continuously, up to twenty-three hours a day, guaranteeing a redundancy level for the plant of around 99% even in the event of a cart failure.

In some specific applications, for example of the postal type, high performance in terms of speed is also required to ensure an efficient high-capacity sorting process (up to 30000 items per hour) and a low margin of error (less than 1/20000 items erroneously sorted).

For example, in some applications it is necessary for the sorter's cart train to move along a closed loop at a high constant speed, for example 2.5 m/s.

The need is therefore felt for providing a wheel drive cart that satisfied the above-mentioned requirements by overcoming the problems of the currently known magnetic, mechanical and electromechanical solutions.

DISCLOSURE OF INVENTION

The above objective is achieved by the present invention in so far as it relates to a wheel drive cart for a transporting and/or sorting system configured to tow a plurality of loading carts movable along a closed path constituted by a first and a second rail parallel to each other, said transporting and/or sorting system comprising at least one item feeding station arranged along said path and configured to load items on said carts and at least one unloading station arranged along said path and configured to receive items coming from said carts; said wheel drive cart comprising a supporting frame provided with a first and a second wheel arranged on opposite sides of the frame and adapted to rest on respective first and second resting surfaces of the first and second rail facing upwards in use; said wheel drive cart further comprising at least one first contrast device carried by the frame and adapted to abut on a first inner side of the first rail and a second contrast device carried by the frame and adapted to abut on a second inner side of said second rail facing the first, the first and the second contrast devices contributing to keep the wheel drive cart positioned between the first and the second rail during the movement of the wheel drive cart along the rails; the first and the second wheel are carried by supporting brackets, angularly movable with respect to said frame about a respective first/second axis parallel to each other, characterized in that each wheel is of the direct drive type, free from reducers, and comprises an electric motor having a stator integral with said bracket and a rotor, a peripheral outward facing portion of which forms a cylindrical surface of the wheel adapted to roll on the first and second resting surfaces, respectively; said first contrast device being connected to the first wheel in order to obtain the angular adjustment of the position of the first wheel about the respective first axis according to the curvature of said first rail along said path; and said second contrast device being connected to the second wheel in order to obtain the angular adjustment of the position of the second wheel about the second axis according to the curvature of said second rail along said path.

BRIEF DESCRIPTION OF THE DRAWINGS

The invention will now be described with reference to the accompanying drawings, which represent a preferred non-limitative embodiment in which:

FIG. 4 shows a front view of a portion of the cart in FIG. 1;

FIG. 5 is a cross-section of the portion in FIG. 4 along the plane V-V;

FIG. 6 shows, on an enlarged scale, a detail of FIG. 4;

FIGS. 9, 10 and 11 show the operation of the cart according to the present invention;

BEST MODE FOR CARRYING OUT THE INVENTION

Figure 13:
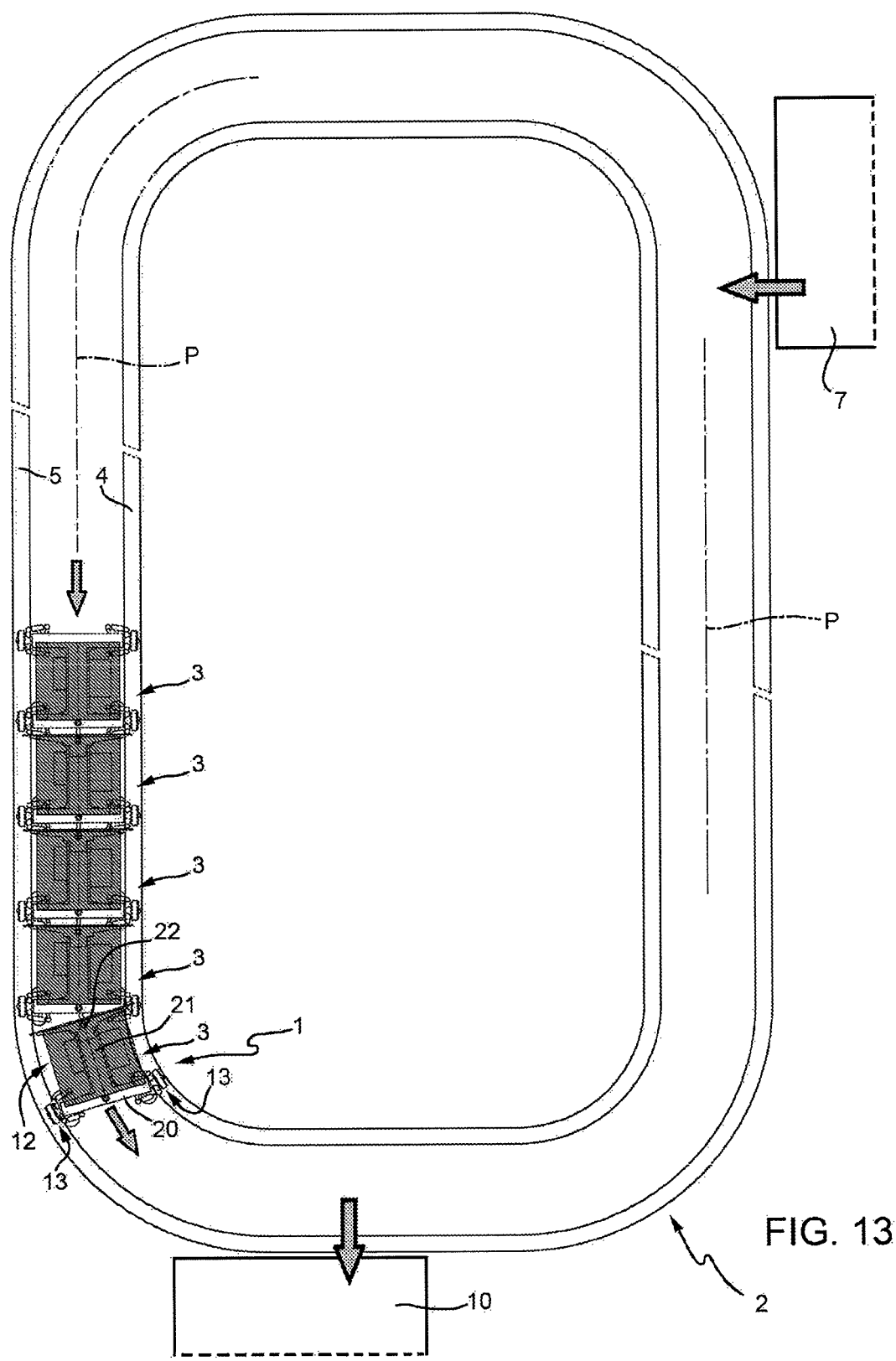
FIG. 13 shows a transporting system that uses the cart according to the present invention.

In FIG. 13 reference numeral 1 indicates, as a whole, a wheel drive cart for a (schematically represented) transporting and/or sorting system 2 configured to tow a plurality of loading carts 3 (of known type and therefore not described in further detail—four loading carts are shown in the example, but their number could be different) forming a cart train movable along a closed path P constituted by a first and a second rail 4 and 5 parallel to each other. The rails 4 and 5 comprise straight sections in which they are straight and parallel and curved sections, typically, but not exclusively, with constant arc-of-a-circle curvature. The transporting system 2 comprises at least one item feeding station 7 arranged along said path P and configured to load items on the carts 1 and 3 and at least one unloading station 10 arranged along the path P and configured to receive items coming from the carts 1 and 3. Typically, a plurality of feeding stations 7 and a plurality of unloading stations 10 are provided. There can be different types of transported and/or sorted items, for example: luggage (airport luggage transfer and/or sorting system), mail items (mail transfer and/or sorting system), packaged items (warehouse transfer and/or sorting system), etc.

The rails 4 and 5 have a rectangular section (FIGS. 4 and 12) and are each delimited by an upper flat surface 4s and 5s facing upwards in use, by a lower flat surface 4d and 5d facing towards a resting plane in use, by two side surfaces 4l and 5l facing the inside of the rails and facing each other and by side surfaces 4e facing outwards. Surfaces 4s and 5s are normally coplanar to a horizontal plane. The rails 4 and 5 are usually made of hollow, extruded section bars in a light metal, for example aluminium. In other applications, the rails 4 and 5 could be made of a different metal, for example folded sheet metal or structural steel.

The wheel drive cart 1 comprises a supporting frame (12) provided with a first and a second wheel 13 arranged on opposite sides of the frame 12 and adapted to rest on respective first and second resting surfaces 4s and 5s of the rails 4 and 5.

The wheel drive cart 1 further comprises a first contrast device 15 carried by the frame 12 and adapted to abut on the inner side surface 41 of the first rail 4 and a second contrast device 16 carried by the frame 12 and adapted to abut on the inner side surface 51 of the second rail 5 (FIG. 12 and FIG. 1); the first and the second contrast devices 15 and 16 keeping the wheel drive cart 1 positioned between the first and the second rail 4 and 5 during the movement of the wheel drive cart along the rails 4 and 5, ensuring the continuous resting of the wheels 13 on the respective upper surface 4s and 5s.

The first contrast device 15 is connected to the first wheel 13 in order to obtain the angular adjustment of the position of the first wheel about a respective first axis 32, based on the curvature of the first rail 4 along the path P; and the second contrast device 16 is connected to the second wheel 13 in order to obtain the angular adjustment of the position of the second wheel 13 about the second axis 32, based on the curvature of the second rail 5 along the path P. In particular, when the rails 4 and 5 are straight, the first and second contrast devices 15 and 16 hold the wheels 13 so as obtain an instantaneous direction of travel parallel to the rails, while on the bends the wheels are automatically steered, keeping the direction of travel tangential to the path P/direction of travel.

In this way, the creation of a sliding component, which would generate an increase in consumption and wear preventing the required performance from being achieved, is averted.

Figure 12:
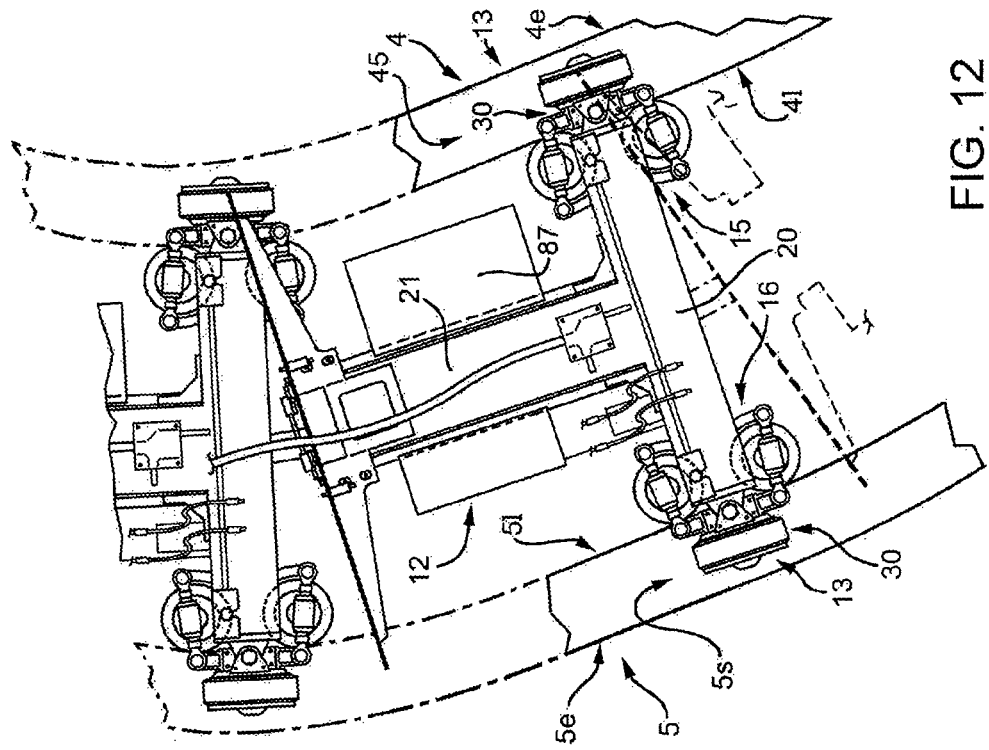
FIG. 12 shows, seen from above, a cart made according to the present invention.
Figure 11:
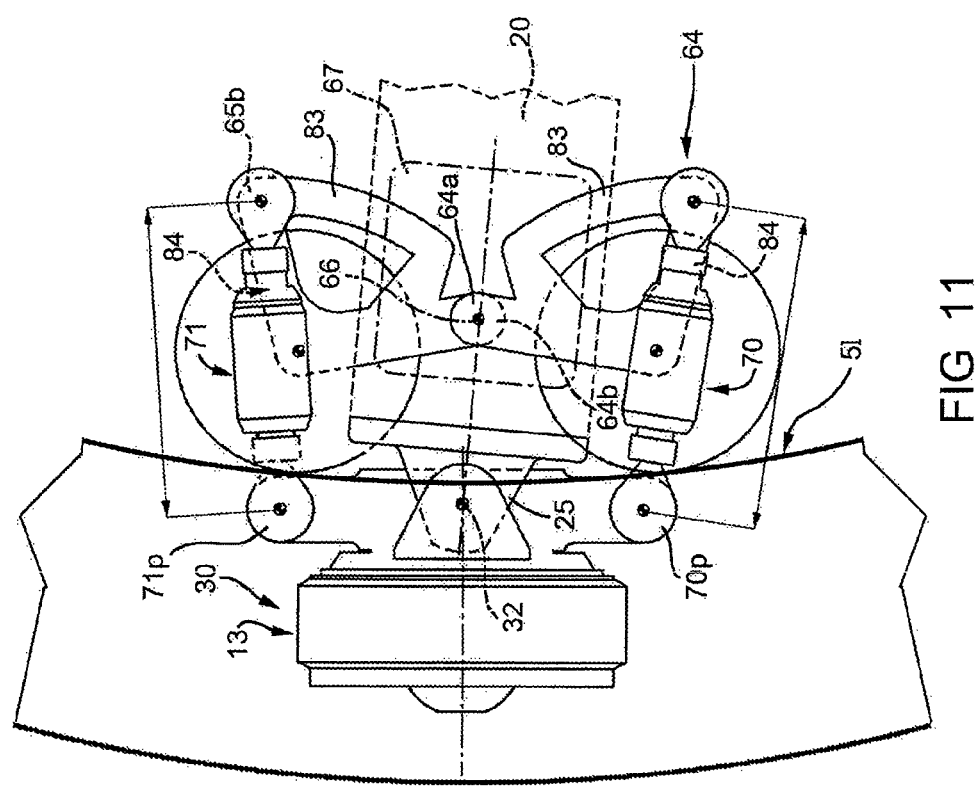

As visible in FIGS. 1, 12 and 13, the frame 12 has a T structure and comprises a straight crossmember 20 (typically with a square section) that carries on its opposite free ends (in ways that will be explained below) the first and the second wheel 13 and a longitudinal member 21, which extends from a central portion of the crossmember 20 perpendicularly to said crossmember 20. A free end portion of the longitudinal member 21 is provided with a spherical joint 22 (FIG. 13) for the coupling between two adjacent carts 1 and 3. The coupling between a leading wheel drive cart 1 and a trailing loading cart 3 is made in such a way that the rear portion of the longitudinal member is arranged in a raised position with respect to the plane of the rails 4 and 5. The crossmember 20 and the longitudinal member 21 are usually made of aluminium section. Each flat end portion of the crossmember is provided with threaded holes for mounting a flat square plate 24 (FIGS. 4 and 6) fitted with an appendage 25 of isosceles trapezoid section that extends outwards, coaxially to the crossmember 20.

The appendage 25 is provided with a cylindrical through hole (FIG. 6) having an axis 32 perpendicular to the axis of the crossmember 20 and housing a threaded metal ring 27 mounted on self-lubricating bushes for high loads adapted to support a bracket 30 that carries the wheel 13 and is angularly movable about the appendage 25, allowing height adjustment. In this way, the first and the second wheel 13 are carried by the support brackets 30, which are angularly movable with respect to the frame 12 about a respective first/second axis 32 parallel to each other.

The bracket 30 is C-shaped and comprises a pair of flat rectangular end walls 34, which are parallel to each other (FIG. 6), perpendicular to axis 32 and interconnected by an intermediate flat rectangular wall 35 transversal to flat walls 34.

According to the present invention, each wheel 13 is of the direct drive type, free from reducers, and comprises an electric motor 36 (FIG. 5) having a stator 37 integral with the bracket 30 (in the example, the stator 37 is connected to flat wall 35) and a rotor 38, an outside portion of which forms a cylindrical surface of the wheel 13 adapted to roll on the first and the second resting surface 4s and 5s, respectively.

Referring to FIG. 5, the stator 37 comprises a first cup-shaped body 40 carried by the bracket 30 and wholly housing a toroidal structure 41 formed by magnetic sheet-metal plates around which the windings of the stator 37 are wrapped. The cup-shaped body 40 comprises a flat circular wall 43 stably fixed to wall 35 and a short tubular wall 44 coaxial to a rotation axis 47 of the wheel 13.

The rotor 38 comprises a second cup-shaped body 50 angularly movable with respect to cup-shaped body 40 about axis 47; in particular, cup-shaped body 40 comprises a flat circular wall 52 perpendicular to axis 47 and a tubular cylindrical part 53 that carries a plurality of permanent magnets 54 on an inner face thereof, which are angularly and evenly spaced apart and face the toroidal structure 41. A metal tube 55 extends internally inside cup-shaped body 50 coaxially to axis 47 and towards wall 53. The metal tube 55 houses a ball bearing 57 carried by a shaft 58 coaxial to axis 47 and integral with wall 52. The bearing 47 enables rotation of cup-shaped body 50 with respect to cup-shaped body 40 about axis 47 and therefore the rotation of the rotor (magnets 54) with respect to the stator (toroidal structure 41).

As visible in FIGS. 5 and 6, each wheel 13 comprises a annular body 60 mounted in a removable manner (screws can be used according to known fastening technologies) on the second cup-shaped body 50 (i.e. on the rotor) and delimited by a cylindrical lateral surface designed to roll on the first and on the second resting surface 13s and 13d. The annular body is usually made of a plastic material that has a good friction coefficient with the metal forming the rails 4 and 5. The annular body 60 becomes worn during operation of the cart and can be easily removed and replaced without the need to change other parts of the wheel 13.

According to a variant of the invention, the annular body 60 can be covered with a layer of material that creates an elastic tread. The elastic material is usually rubber.

Figure 1:
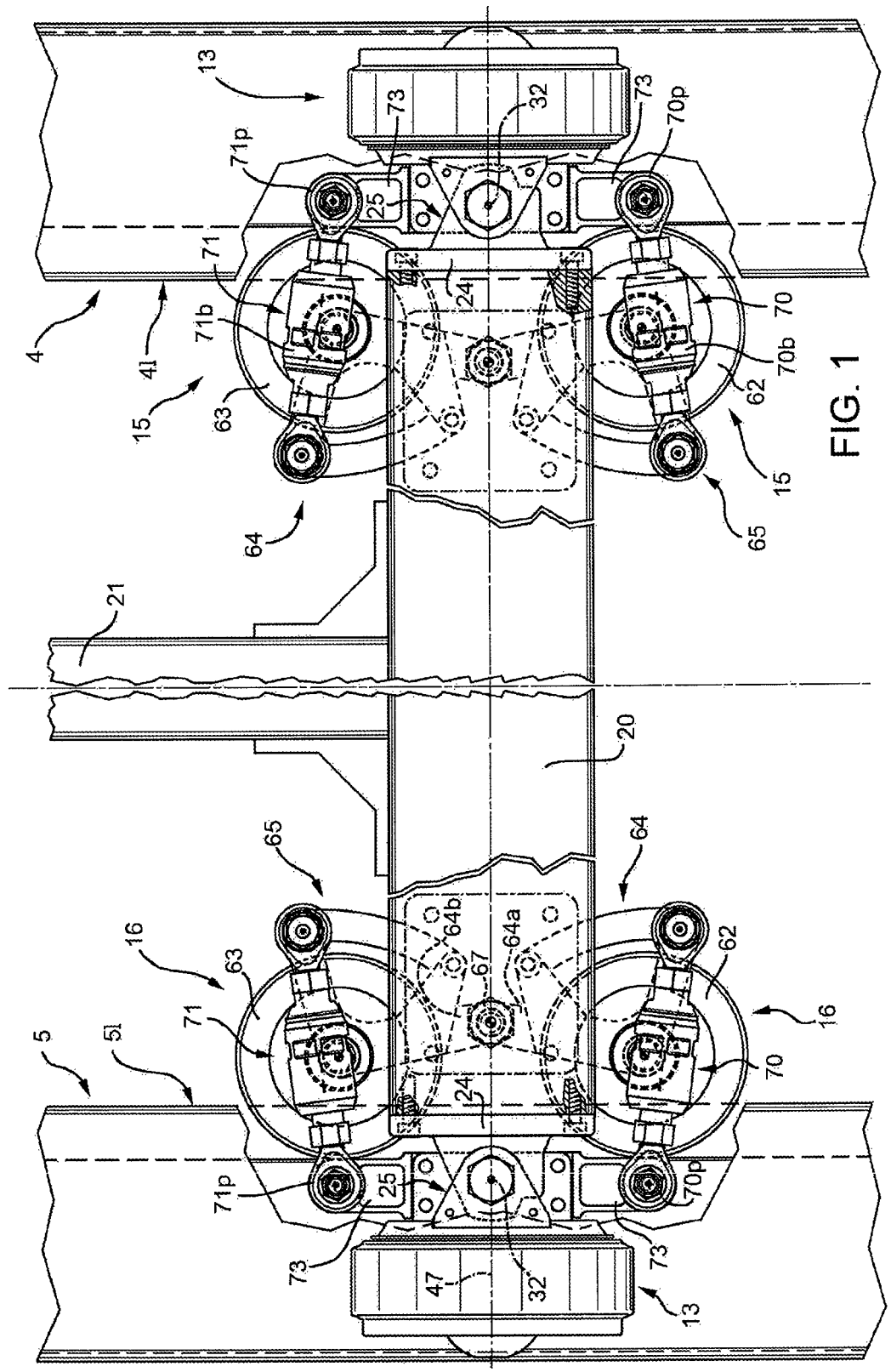
FIG. 1 schematically shows, in plan, a front portion of a wheel drive cart for a transporting and sorting system made according to the principles of the present invention.

Referring to FIGS. 1 and 4, the first contrast device 15 and 16 is mounted beneath the cart 12 and faces side surfaces 41 and 51 of the rails 4 and 5. The contrast device 15 and 16 comprises a first and a second contrast wheel 62 and 63 carried in an angularly free manner by respective supports 64 and 65 having first end portions 64a and 64b hinged (FIGS. 1, 9, 10 and 11) to a common portion 67 of the frame 12 to obtain the rotation of the first/second support 64 and 65 about a third axis 66 parallel to the first/second axis 32.

In particular the common portion 67 of the frame is made from a flat square metal wall fastened to a face of the crossmember 20 facing downwards near an end portion of the crossmember 20.

The contrast device 15 and 16 also comprises a first and a second drive element 70 and 71 interposed between second end portions 64b and 65b of supports 64 and 65 and the bracket 30 and configured to apply an elastic force that ensures the pressure of a rolling portion of each contrast wheel 62 and 63 on the first/second side surface 41 and 51.

Figure 2:
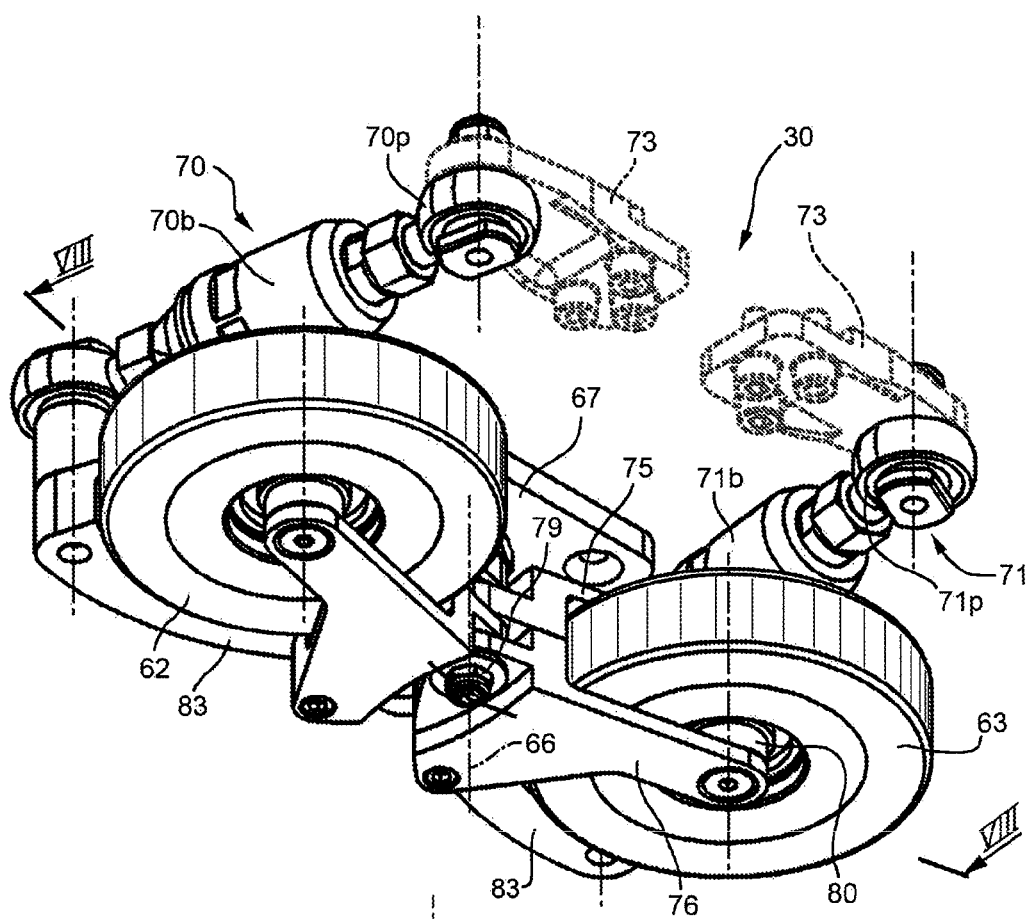
FIGS. 2 and 3 show, in perspective, portions (contrast devices) of the cart in FIG. 1.
Figure 3:
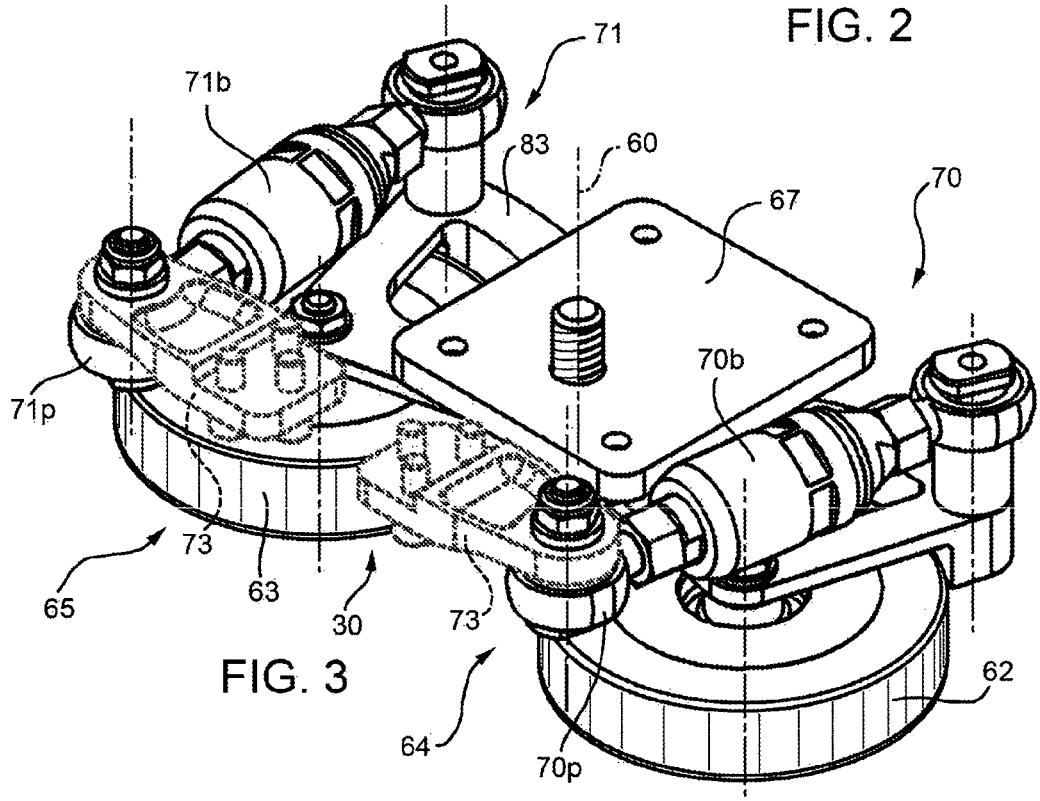
Figure 7:
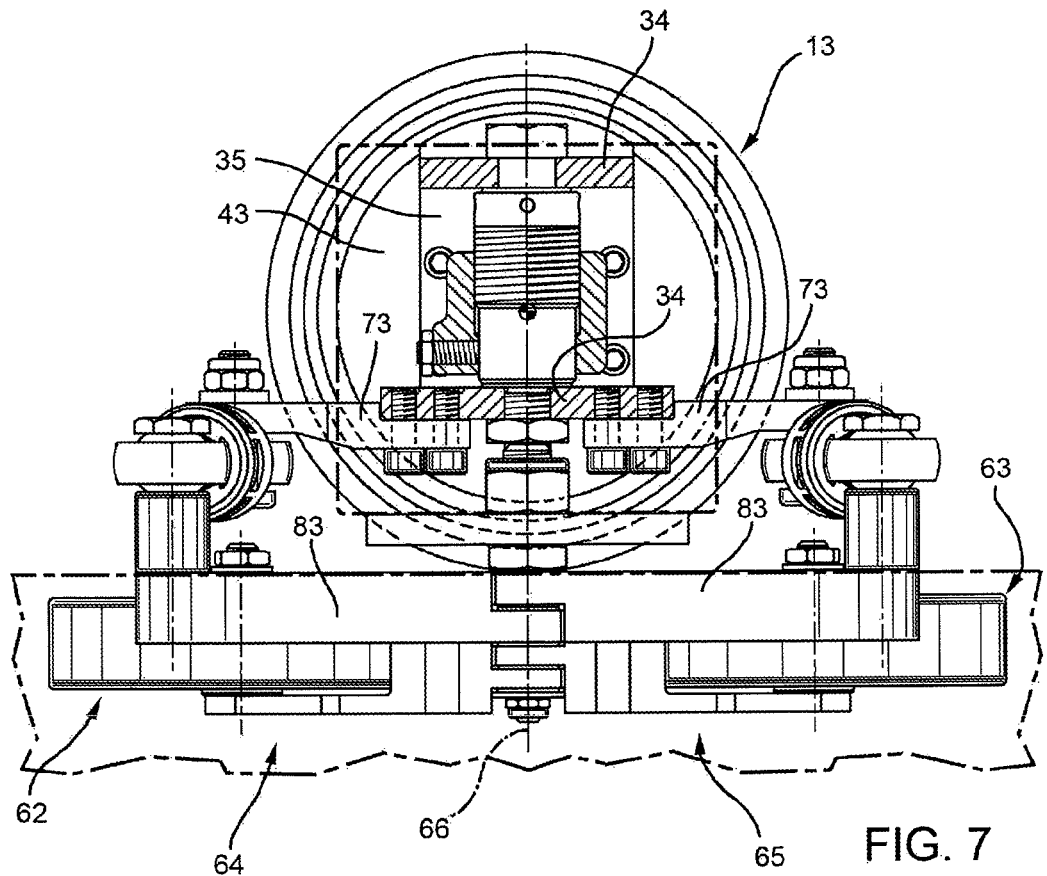
FIG. 7 is a cross-section of the portion in FIG. 4 along the plane VII-VII.

In particular (see also FIGS. 2 and 3), each drive element and 71 comprises a telescopic tie rod having an axially symmetrical casing 70b and 71b hinged by a respective end portion 64b and 65b and a rod 70p and 71p axially movable with respect to the axially symmetrical casing 70b and 71b and provided with an end portion hinged to the bracket 30.

In greater detail, the wall 34 of the bracket 30 facing the rails 4 and 5 is provided with a pair of straight appendages 73, each of which projects from the wall 34 (not shown in FIGS. 2 and 3) and has an end portion hinged to an end portion of a respective rod 70p and 71p.

Figure 8:
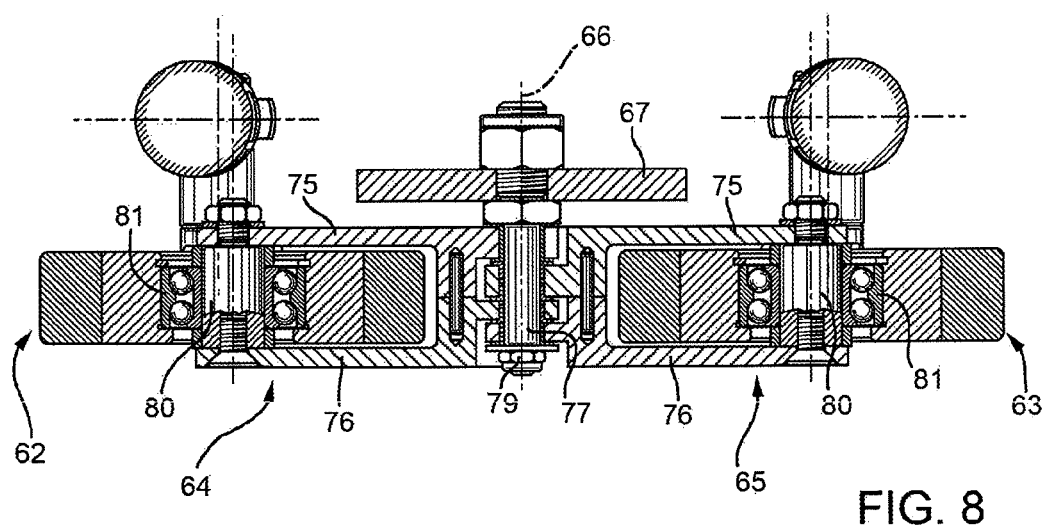
FIG. 8 is a cross-section of the detail in FIG. 4.

Each support 64 and 65 comprises a pair of substantially rectilinear arms 75 and 76 parallel to each other (FIGS. 2 and 8) and having first free ends interconnected to each other and provided with holes arranged coaxial to axis 66 and engaged by a rod 77 (FIG. 8) that extends downwards and perpendicularly from the square metal wall 67. The rod 77 is provided with an end nut 79 to keep the supports 64 and 65 constrained to the frame 12, yet still allow them to rotate about axis 66. The arms 75 and 76 (FIG. 8) have second ends facing each other and supporting a shaft 80 parallel to the third axis 66 (and axes 32). The shaft 80 carries a ball bearing 81 to allow free rotation of the contrast wheel 62 and 63, which thus freely rotates about an axis thereof parallel to axis 66 and axes 32.

A C-shaped element 83 that follows the outer profile of said wheel 62 and 63 extends from the interconnected first end portions of the arms 75 and 76 and has an end potion to which the casing 70b and 71b of the drive element 70 and 71 is hinged.

A straight stiffening element 84 extends between the C-shaped end element 83 and the second end of an arm 75.

The angular rotation of the wheels when steered about the first second axis 32 (FIGS. 9, 10 and 11) follow different angles based on the known principle of Ackermann steering geometry (articulated quadrilateral), according to which the steering angle of the inner wheel is greater than the steering angle of the outer wheel.

This steering effect is obtained automatically due to the action of the contrast wheels 62 and 63 that follow the different curvature of the rails 4 and 5 on curves in order to apply different steering angles for the wheels 13 on the inside and the outside of the curve by means of the articulated quadrilateral comprising the drive elements 70 and 71 and the supports 64 and 73.

In this way, each individual wheel 13 independently directs itself, following the correct curvature profile on which it must run, and minimizing wear and consumption.

The electric motors 36 (brushless type) are operated and controlled by a dedicated electronic control unit that can be conveniently housed in a container 87 (FIG. 12) carried by the longitudinal member 21. This dedicated electronic control unit implements, by means of known algorithms, programs that control the speed of rotation of the electric motors 36 to implement functionality such as anti-skidding, speed and torque control and an electronic differential function. The sorter's rotation speed adjustment loop is closed by a controller (not shown) of the system 2 exploiting wireless communication between the system 2 and the electronic control unit.

The powering of the electric motors 36 is implemented according to known technologies, for example sliding contacts (not shown) or electromagnetic induction for contactless power transfer.

The wheels 13 thus implement direct drive, which eliminates any kinematic chain or transmission coupling. This system significantly reduces the probability of failure, ensuring an extremely high level of plant availability (approximately 99%).

Multiple wheel drive carts 1 can also be used on the same cart train; in fact, in the event of an electric motor 36 of a wheel malfunctioning, this motor 36 is simply switched off by the control system 2, together with its counterpart on that wheel drive cart and, thanks to the redundancy of the wheel drive carts 1 in the cart train, the aforementioned failure does not endanger the forward movement of the train. The drive wheel 13 effectively transforms into a normal cart-supporting idler wheel (the second cup-shaped body 50 can rotate about the first cup-shaped body 40) without generating particular braking effects or risks of jamming.

In addition, the wheels 13 "automatically" steer thanks to the contrast devices 15 and 16 that adjust the angular position of the wheels about axis 32 in such a way that the wheels "follow" the curvature of the rails 4 and 5.

Furthermore, the cart 1 has extremely high performance compared to carts operating according to known technologies.

Based on tests carried out, wheels 13 have been produced (with rolling radius of 78-75 mm) capable of providing continuous torque of 11.8 Nm and 19.7 Nm for 10 sec. and a maximum speed of 38.1 rad/s, corresponding to a maximum speed of 3 m/sec for rotation of the carts 1 and 3 along the path P.

What is claimed is:

1. A wheel drive cart for a transporting and/or sorting system configured to tow a plurality of loading carts movable along a closed path constituted by a first rail and a second rail parallel to each other, said transporting and/or sorting system comprising at least one item feeding station arranged along said path and configured to load items on said carts and at least one unloading station arranged along said path and configured to receive items coming from said carts; said wheel drive cart comprising:
   a supporting frame provided with a first wheel and a second wheel arranged on opposite sides of the frame and that are to rest on respective first and second resting surfaces of the first rail and the second rail facing upwards in use; and
   at least one first contrast device carried by the frame and that is to abut on a first inner side of the first rail and a second contrast device carried by the frame and that is to abut on a second inner side of said second rail facing the first inner side, the first and the second contrast devices maintain the wheel drive cart positioned between the first rail and the second rail during movement of the wheel drive cart along the first and second rails, wherein
   the first wheel and the second wheel are carried by supporting brackets, angularly movable with respect to said frame about a respective first/second axis parallel to each other,
   each of the first wheel and the second wheel is a direct drive wheel free from reducers and comprises an electric motor having a stator integral with a respective one of said brackets and a rotor, a peripheral outward facing portion of which forms a cylindrical surface of the first or second wheel that is to roll on the first and the second resting surfaces, respectively,
   said first contrast device being connected to the first wheel in order to obtain angular adjustment of a position of the first wheel about the respective first axis according to a curvature of said first rail along said path, and
   said second contrast device being connected to the second wheel in order to obtain angular adjustment of a position of the second wheel about the respective second axis according to a curvature of said second rail along said path.

2. The wheel drive cart according to claim 1, wherein at least one of said first contrast device and said second contrast device comprises a first contrast wheel and a second contrast wheel carried in an angularly free manner by respective first/second supports having first end portions hinged to a common portion of said frame to obtain rotation of the first/second supports about a third axis parallel to the first/second axis;
   said at least one of said first contrast device and said second contrast device further comprising first and second drive elements interposed between second free end portions of the first/second supports and said bracket and configured to apply an elastic force that ensures pressure of a rolling portion of each contrast wheel on said first/second inner side of said first/second rail, respectively.

3. The wheel drive cart according to claim 2, wherein at least one of said brackets is C-shaped and comprises a pair of flat end walls that are parallel to each other, perpendicular to the first/second axis and interconnected by an intermediate flat wall transversal to said flat end walls and supporting the stator of said first or second wheel;
   a wall of the at least one of said brackets facing towards the first and second rails is provided with a pair of appendages, each of which has an end portion hinged to an end portion of a respective one of the first and second contrast devices.

4. The wheel drive cart according to claim 2, wherein each of the first/second supports comprises a pair of substantially rectilinear arms parallel to each other and having first free ends interconnected to each other and provided with holes arranged side-by-side coaxial to the third axis and engaged by a rod that extends downwards from the frame; the rod is provided with a retention structure to keep the first/second supports constrained to the frame whilst allowing rotation about the third axis; said substantially rectilinear arms having second ends facing each other and supporting a shaft that allows free rotation of a respective one of the first and second contrast wheels, which freely rotates about an axis thereof parallel to the third axis.

5. The wheel drive cart according to claim 4, wherein a C-shaped element is provided that extends from the interconnected first free ends of the two substantially rectilinear arms and follows an outer profile of said respective one of the first and second contrast wheels; the C-shaped element has an end portion to which a portion of a respective one of the first and second drive elements is hinged.

6. The wheel drive cart according to claim 1, wherein each first wheel and second wheel comprises an annular body mounted in a removable manner on the rotor and delimited by a cylindrical lateral surface that is to roll on the first and second resting surfaces, respectively.

7. The wheel drive cart according to claim 6, wherein said annular body is covered by a layer of material that forms an elastic tread.

8. The wheel drive cart according to claim 7, wherein the material is rubber.

9. The wheel drive cart according to claim 1, wherein said stator comprises a first cup-shaped body carried by a respective one of said brackets and wholly housing a toroidal structure supporting windings of the stator;
  said rotor comprises a second cup-shaped body angularly movable with respect to the first cup-shaped body about a wheel rotation axis;
  the second cup-shaped body comprises a flat circular wall perpendicular to the wheel rotation axis and a tubular cylindrical part that carries a plurality of permanent magnets on an inner face thereof, which are angularly and evenly spaced apart and face the toroidal structure.

10. The wheel drive cart according to claim 9, wherein the first cup-shaped body comprises a flat circular wall, which is stably fixed to a respective one of the brackets, and a tubular wall, which is coaxial to the wheel rotation axis of the first or second wheel.

11. A wheel drive cart for a transporting and/or sorting system configured to tow a plurality of loading carts movable along a closed path constituted by a first rail and a second rail parallel to each other, said transporting and/or sorting system comprising at least one item feeding station arranged along said path and configured to load items on said carts and at least one unloading station arranged along said path and configured to receive items coming from said carts; said wheel drive cart comprising:
  a supporting frame provided with a first wheel and a second wheel arranged on opposite sides of the frame and that are to rest on respective first and second resting surfaces of the first rail and the second rail facing upwards in use; and
  at least one first contrast device carried by the frame and that is to abut on a first inner side of the first rail and a second contrast device carried by the frame and that is to abut on a second inner side of said second rail facing the first inner side, the first and the second contrast devices maintain the wheel drive cart positioned between the first rail and the second rail during movement of the wheel drive cart along the first and second rails, wherein
  the first wheel and the second wheel are carried by supporting brackets, angularly movable with respect to said frame about a respective first/second axis parallel to each other,
  each of the first wheel and the second wheel is a direct drive wheel free from reducers and comprises an electric motor having a stator integral with a respective one of said brackets and a rotor, a peripheral outward facing portion of which forms a cylindrical surface of the first or second wheel that is to roll on the first and the second resting surfaces, respectively,
  said first contrast device being connected to the first wheel in order to obtain angular adjustment of a position of the first wheel about the respective first axis according to a curvature of said first rail along said path,
  said second contrast device being connected to the second wheel in order to obtain angular adjustment of a position of the second wheel about the respective second axis according to a curvature of said second rail along said path,
  at least one of said first contrast device and said second contrast device comprises a first contrast wheel and a second contrast wheel carried in an angularly free manner by respective first/second supports having first end portions hinged to a common portion of said frame to obtain rotation of the first/second supports about a third axis parallel to the first/second axis,
  said at least one of said first contrast device and said second contrast device further comprising first and second drive elements interposed between second free end portions of the first/second supports and said bracket and configured to apply an elastic force that ensures pressure of a rolling portion of each contrast wheel on said first/second inner side of said first/second rail, respectively, and
  each of the first and second drive elements comprises a telescopic tie rod having an axially symmetrical casing and a rod that is axially movable with respect to said axially symmetrical casing.

12. A wheel drive cart for a transporting and/or sorting system configured to tow a plurality of loading carts movable along a closed path constituted by a first rail and a second rail parallel to each other, said transporting and/or sorting system comprising at least one item feeding station arranged along said path and configured to load items on said carts and at least one unloading station arranged along said path and configured to receive items coming from said carts; said wheel drive cart comprising:
  a supporting frame provided with a first wheel and a second wheel arranged on opposite sides of the frame and that are to rest on respective first and second resting surfaces of the first rail and the second rail facing upwards in use; and
  at least one first contrast device carried by the frame and that is to abut on a first inner side of the first rail and a second contrast device carried by the frame and that is to abut on a second inner side of said second rail facing the first inner side, the first and the second contrast devices maintain the wheel drive cart positioned between the first rail and the second rail during movement of the wheel drive cart along the first and second rails, wherein
  the first wheel and the second wheel are carried by supporting brackets, angularly movable with respect to said frame about a respective first/second axis parallel to each other,
  each of the first wheel and the second wheel is a direct drive wheel free from reducers and comprises an electric motor having a stator integral with a respective one of said brackets and a rotor, a peripheral outward facing portion of which forms a cylindrical surface of the first or second wheel that is to roll on the first and the second resting surfaces, respectively,
  said first contrast device being connected to the first wheel in order to obtain angular adjustment of a position of the first wheel about the respective first axis according to a curvature of said first rail along said path,
  said second contrast device being connected to the second wheel in order to obtain angular adjustment of a position of the second wheel about the respective second axis according to a curvature of said second rail along said path, and
  said frame has a T-shaped structure and comprises a crossmember that carries on its opposite free ends the first and the second wheels and a longitudinal member, which extends from a central portion of the crossmember perpendicularly to the crossmember; a free end portion of the longitudinal member being provided with a joint to couple two adjacent carts.

13. The wheel drive cart according to claim 12, wherein first and second plates are provided connectable to respective free head ends of said crossmember; each of the brackets being carried by a respective one of said first and second plates in an angularly movable manner about said first/second axis.

* * * * *